United States Patent
Wei et al.

(10) Patent No.: US 11,446,864 B2
(45) Date of Patent: Sep. 20, 2022

(54) ADDITIVE MANUFACTURING COMPOSITIONS AND METHODS FOR THE SAME

(71) Applicant: PALO ALTO RESEARCH CENTER INCORPORATED, Palo Alto, CA (US)

(72) Inventors: Junhua Wei, Palo Alto, CA (US); Anne Plochowietz, Palo Alto, CA (US); Kent Evans, Sunnyvale, CA (US); Sean E. Doris, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 248 days.

(21) Appl. No.: 16/816,105

(22) Filed: Mar. 11, 2020

(65) Prior Publication Data

US 2021/0283837 A1 Sep. 16, 2021

(51) Int. Cl.
| | | |
|---|---|---|
| *B29C 64/188* | (2017.01) | |
| *B29C 64/118* | (2017.01) | |
| *B29C 64/153* | (2017.01) | |
| *C23C 18/54* | (2006.01) | |
| *G06T 17/00* | (2006.01) | |
| *B33Y 10/00* | (2015.01) | |
| *B33Y 70/00* | (2020.01) | |
| *B33Y 80/00* | (2015.01) | |
| *B33Y 40/20* | (2020.01) | |
| *B29K 55/02* | (2006.01) | |
| *B29K 67/00* | (2006.01) | |

(52) U.S. Cl.
CPC .......... *B29C 64/188* (2017.08); *B29C 64/118* (2017.08); *B29C 64/153* (2017.08); *C23C 18/54* (2013.01); *G06T 17/00* (2013.01); *B29K 2055/02* (2013.01); *B29K 2067/046* (2013.01); *B33Y 10/00* (2014.12); *B33Y 40/20* (2020.01); *B33Y 70/00* (2014.12); *B33Y 80/00* (2014.12); *C08K 2201/001* (2013.01)

(58) Field of Classification Search
CPC ... B29C 64/188; B29C 64/153; B29C 64/118; G06T 17/00; B33Y 70/00; C23C 18/54

USPC ....................................................... 428/423.7
See application file for complete search history.

(56) References Cited

U.S. PATENT DOCUMENTS

| | | | |
|---|---|---|---|
| 2015/0366073 A1* | 12/2015 | Magdassi | B29C 64/112 264/494 |
| 2017/0253681 A1* | 9/2017 | Shen | B29C 64/165 |
| 2017/0284876 A1 | 10/2017 | Moorlag et al. | |
| 2017/0326645 A1 | 11/2017 | Saito et al. | |
| 2018/0050486 A1 | 2/2018 | Talgorn et al. | |
| 2018/0319108 A1* | 11/2018 | Sherrer | B29C 64/106 |

FOREIGN PATENT DOCUMENTS

| | | | |
|---|---|---|---|
| KR | 20180003881 A | * | 1/2018 |
| KR | 20180003881 A | | 1/2018 |
| WO | 2014/118783 A1 | | 8/2014 |

OTHER PUBLICATIONS

Niino et al., 13th International Congress Molded Interconnect Devices (MID), IEEE, Sep. 25, 2018, pp. 1-4. (Year: 2018).*
Wang et al., ACS Appl. Mater. Interfaces, 11, 21668-21674, 2019. (Year: 2019).*
Extended European Search Report dated Jul. 20, 2021 in corresponding European Application No. 21159103.7, 9 pages.
Niino et al., "Development of LS-LDS combined process and material enabling simultaneous activation during additive manufacturing process," 2018 13th International Congress Molded Interconnect Device (MID), IEEE, Sep. 25, 2018, pp. 1-4.

* cited by examiner

*Primary Examiner* — Hui H Chin
(74) *Attorney, Agent, or Firm* — MH2 Technology Law Group LLP

(57) ABSTRACT

Additive manufacturing compositions and methods for fabricating a conductive article with the same are provided. The additive manufacturing composition may include a 3D printable material and a metal precursor disposed in the 3D printable material. The metal precursor may include a metal salt, a metal particle, or combinations thereof. The method may include forming a first layer of the article on a substrate, where the first layer includes the additive manufacturing composition, forming a second layer of the article adjacent the first layer, and binding the first layer with the second layer to fabricate the article. The method may also include plating a metal on at least a portion of the article to fabricate the conductive article.

20 Claims, 4 Drawing Sheets

ADDITIVE MANUFACTURING COMPOSITIONS AND METHODS FOR THE SAME

TECHNICAL FIELD

The presently disclosed embodiments or implementations are directed to additive manufacturing or 3D printing compositions and methods for fabricating conductive articles with the 3D printing compositions.

BACKGROUND

Articles integrating conductive structures fabricated via an additive manufacturing or 3D printing process are highly desirable as they provide an assembly free process for fabricating complex articles with multiple functionalities. Conventional strategies for fabricating these conductive structures may often include incorporating conductive elements, such as metal particles, conductive polymers, or carbon based materials (e.g., graphene) into building materials (e.g., filaments, powder stocks, etc.) of the 3D printing process to prepare composite building materials, and printing or fabricating the conductive structure with the composite building materials. The conductivity achieved in the conductive structures fabricated via these conventional strategies, however, is limited. For example, the conductivity achieved in the conductive structures is directly related to the amount or concentration of the conductive elements that can be incorporated into the building materials, and the concentrations necessary to achieve bulk metal conductivity often results in unstable composite building materials that exhibit relatively poor rheological properties as compared to the building materials without the conductive elements. As such, utilizing the unstable composite building materials may often lead to various printing issues, such as clogged printheads, poor resolution, and poor reproducibility.

What is needed, then, are improved 3D printing compositions and methods for fabricating conductive articles with the 3D printing compositions.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide an additive manufacturing composition for fabricating a conductive article. The additive manufacturing composition may include a 3D printable material and a metal precursor disposed in the 3D printable material. The metal precursor may include a metal salt, a metal particle, or combinations thereof.

In some examples, the 3D printable material may include at least one water insoluble polymer.

In some examples, the 3D printable material may include one or more of acrylonitrile butadiene styrene (ABS), polylactic acid (PLA), thermoplastic polyurethane (TPU), polystyrene, polypropylene (PP), polyethylene (PE), ethylene vinyl acetate (EVA), thermoplastic polyolefin (TPO), rubber, nylon, polycaprolactone (PCL), polyethylene terephthalate (PET), polyethylene terephthalate glycol (PTG), polyamide, aromatic polyamide, polyether, polyester, polymethylmethacrylate (PMMA), polyurethane copolymers, ethylene vinyl alcohol, or combinations thereof.

In some examples, the 3D printable material may be selected from the group consisting of PLA, PCL, ABS, and combinations thereof.

In some examples, the metal precursor may include the metal salt. The metal salt may include a metal cation selected from the group consisting of a nickel cation, a zinc cation, a tin cation, a platinum cation, copper cation, a palladium cation, a silver cation, a gold cation, an aluminum cation, an iron cation, a magnesium cation, and combinations thereof.

In some examples, the metal salt may include an anion selected from the group consisting of an acetylacetonate, 2-ethylhexanoate, phthalocyanine, fluoride, chloride, bromide, iodide, sulfide, nitrate, phosphate, carbonate, oxalate, formate, sulfate, triflate, bis(trifluoromethyl)sulfonimide, tetrafluoroborate, hexafluorophosphate, and combinations thereof.

In some examples, the metal salt may include one or more of copper (II) acetylacetonate ($Cu(O_2C_5H_7)_2$), copper sulfate ($CuSO_4 \cdot 5H_2O$), copper chloride, copper citrate, copper acetate, copper phosphate ($Cu_3(PO_4)_2$), gold chloride (AuCl), gold bromide (AuBr), gold iodide (AuI), tetrabromoauric acid ($HAuBr_4$), tetrachloroauric acid ($HAuCl_4$), palladium sulfate, ($PdSO_4 \cdot 7H2O$), palladium chloride, palladium nitrate, palladium acetate, palladium 2,4-pentanedionate, or combinations thereof.

In some examples, the composition may consist of the 3D printable material and the metal precursor.

In some examples, the 3D printable material may consist of polylactic acid and the metal precursor may consist of copper (II) acetylacetonate ($Cu(O_2C_5H_7)_2$).

In some examples, the additive manufacturing composition may be a 3D printable filament.

In some examples, the additive manufacturing composition may be a 3D printable powder.

In some examples, the additive manufacturing composition may be a 3D printable resin.

In some examples, the metal precursor may include the metal particle. The metal particle may include one or more of copper particles, silver particles, gold particles, aluminum particles, magnesium particles, manganese particles, iron particles, nickel particles, zinc particles, tin particles, platinum particles, palladium particles, or combinations thereof.

The present disclosure may provide a method for fabricating a conductive article. The method may include forming a first layer of an article on a substrate. The first layer may include any one or more of the additive manufacturing composition disclosed herein. For example, the first layer may include an additive manufacturing composition including a 3D printable material and a metal precursor disposed in the 3D printable material, where the metal precursor may include a metal salt, a metal particle, or combinations thereof. The method may also include forming a second layer of the article adjacent the first layer. The method may further include binding the first layer with the second layer to fabricate the article. The method may also include plating a metal on at least a portion of the article to fabricate the conductive article.

In some examples, the method may further include activating the metal precursor of the additive manufacturing composition with a reducing agent.

In some examples, plating the metal on at least a portion of the article may include an electroless plating process.

In some examples, the electroless plating process may further include depositing metal on or about the activated metal precursors.

In some examples, the second layer may include a water soluble polymer.

In some examples, the second layer may include a 3D printable material substantially free of any metal precursors.

In some examples, the method may further include generating a digital model of the article with a computer aided design assembly. The method may also include partitioning the digital model into at least a first digital cross-section and a second digital cross-section. Forming the first layer of the article on the substrate may include forming the first layer of the article on the substrate using the first digital cross-section as a first template. Forming the second layer of the article adjacent the first layer may include forming the second layer of the article adjacent the first layer using the second digital cross-section as a second template.

In some examples, the conductive article may have or include a conductivity of at least 1E6 Siemens per meter (S/m).

The present disclosure may provide a kit for additive manufacturing of a conductive article. The kit may include any one or more of the additive manufacturing compositions disclosed herein. The kit may also include an activation solution and a deposition solution. The activation solution may include a reducing agent configured to activate the metal precursor of the additive manufacturing composition. The deposition solution may be configured to deposit metal on or about the activated metal precursor.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

Figure 1:
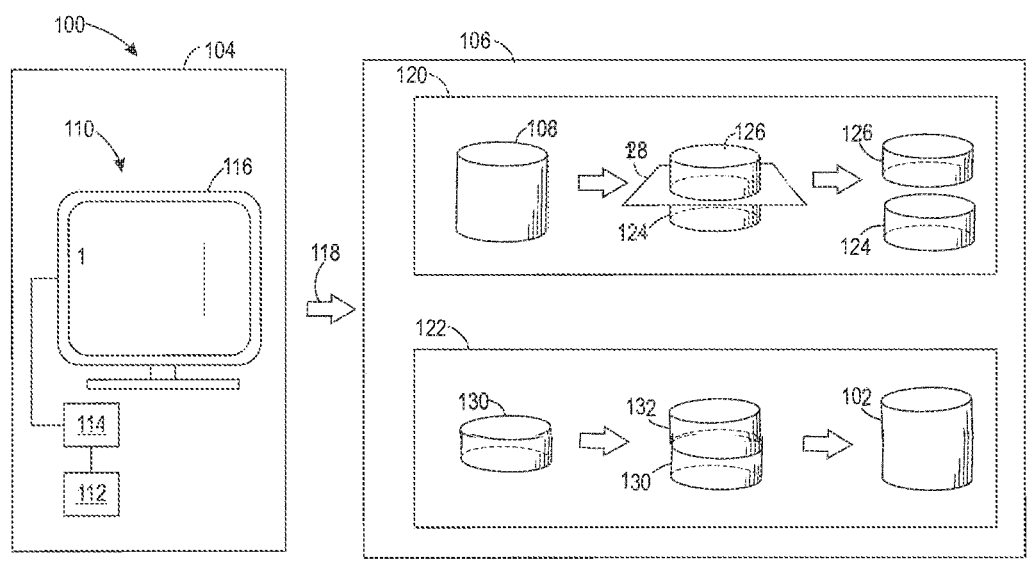
FIG. 1 illustrates a schematic of an exemplary system for fabricating an article from a 3D printable composition via a 3D printing process, according to one or more embodiments disclosed.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

Compositions

Compositions disclosed herein may be or include compositions suitable for, capable of, or configured to be utilized in one or more additive manufacturing or three-dimensional (3D) printing processes. For example, the compositions disclosed herein may be 3D printable compositions suitable for, capable of, or configured to be utilized as a stock material or building material in the one or more additive manufacturing or 3D printing processes. As such, the 3D printable compositions disclosed herein may be utilized to fabricate at least a portion or one or more portions (e.g., layers) of a 3D printed article, such as a conductive or non-conductive 3D printed article, via the 3D printing processes.

The compositions disclosed herein may include one or more metal precursors and one or more 3D printable materials. For example, the 3D printable compositions may be or include a composite material including a mixture or combination of the one or more metal precursors and the one or more 3D printable materials. The one or more metal precursors may be disposed, mixed, suspended, dispersed, dissolved, combined, or otherwise contacted with the one or more 3D printable materials of the 3D printable composition.

The 3D printable composition may be in any shape, size, and/or form suitable for, capable of, or configured to be utilized in the one or more 3D printing processes. In at least one embodiment, the 3D printable composition may be provided as a filament, such as a filament fabricated via extrusion and/or spinning. In another embodiment, the 3D printable composition may be provided as particles, granules, powders, agglomerations, or the like. In yet another embodiment, the 3D printable composition may be provided as a solution or melt, such as a resin solution or melted polymer.

In at least one embodiment, the 3D printable composition may be free or substantially free of any one or more volatile materials. Particularly, in at least one embodiment, the 3D printable composition may be free or substantially free or water, acetone, methylethylketone (MEK), cyclohexanone, methanol, ethanol, isopropanol, pentane, hexane, heptane, cyclohexane, chloroform, dichloromethane, benzene, toluene, xylene, chlorobenzene, dichlorobenzene, N-methylpyrrolidone (NMP), N,N-dimethylformamide (DMF), or other volatile solvents known to those skilled in the art, or the like, or combinations thereof. As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

The 3D printable composition may be triggered or stimulated to change a phase thereof. For example, the 3D printable composition may be triggered or stimulated by an outside trigger or stimulus, respectively, to change the 3D printable composition from a solid phase to a liquid phase (e.g., melted polymer or melt or viscoelastic fluid) or from a liquid phase to a solid phase. In at least one embodiment, the 3D printable composition may directly change from a solid phase to a liquid phase, or may directly change from a liquid phase to a solid phase. Illustrative triggers or stimulus that may change the phase of the 3D printable composition may be or include, but are not limited to, temperature change (e.g., from a heat source), light irradiation, pressure change, or the like, or any combination thereof.

The one or more metal precursors may be or include any material, substance, compound, and/or complex suitable for, capable of, or configured to be processed or treated to produce a metal and/or facilitate the deposition of a metal. For example, the one or more metal precursors may be or include any material, substance, compound, and/or complex that may aid, promote, or facilitate electroless metal deposition. As used herein, the term or expression "electroless metal deposition," "electroless deposition," "electroless plating," or the like, may refer to a process where a metal (e.g., copper, gold, silver, aluminum, nickel, platinum, etc.) is deposited on a surface without using external electrical power. Illustrative metal precursors may be or include, but are not limited to, one or more metal particles (e.g., nano- and micro-particles), catalysts (e.g., metal catalysts), reducing agents, metal salts, metal compounds, metal complexes (e.g., inorganic and/or organic metal complexes), metal coordination complexes, or the like, or any combination thereof.

In at least one embodiment, the one or more metal precursors may be or include a metal salt or a metal complex having one or more metal cations and one or more anions. Illustrative metal cations may be or include, but are not limited to, an alkaline earth metal, a transition metal, a post-transition metal, or any combination thereof. For example, the metal cation of the metal salt or metal complex may be or include, but is not limited to, a copper cation, a silver cation, a gold cation, an aluminum cation, a magnesium cation, a manganese cation, an iron cation, a nickel cation, a zinc cation, a tin cation, a platinum cation, a palladium cation, or the like, or any combination thereof. Illustrative anions of the metal salt or metal complex may be or include, but is not limited to, an acetylacetonate, 2-ethylhexanoate, phthalocyanine, fluoride, chloride, bromide, iodide, sulfide, nitrate, phosphate, carbonate, oxalate, formate, sulfate, triflate, bis(trifluoromethyl)sulfonimide, tetrafluoroborate, hexafluorophosphate, or the like, or any combination thereof. Illustrative metal salts or metal complexes may be or include, but are not limited to, copper (II) acetylacetonate ($Cu(O_2C_5H_7)_2$), copper sulfate ($CuSO_4.5H2O$), copper chloride (CuCl or $CuCl_2$), copper citrate, copper acetate, copper phosphate ($Cu_3(PO_4)_2$), nickel sulfate, nickel chloride, nickel nitrate, silver nitrate, silver sulfate, silver chloride, gold chloride (AuCl), gold bromide (AuBr), gold iodide (AuI), tetrabromoauric acid ($HAuBr_4$), tetrachloroauric acid ($HAuCl_4$), palladium sulfate ($PdSO_4.7H_2O$), palladium chloride, palladium nitrate, palladium acetate, palladium 2,4-pentanedionate, tin chloride, platinum chloride, derivatives thereof, or the like, or any combination thereof. In at least one embodiment, the metal salt and/or metal complex may have a solubility in water of less than 5 g/L, less than 4 g/L, less than 3 g/L, less than 2 g/L, less than 1 g/L, less than 0.8 g/L, or less than 0.6 g/L.

Illustrative metal particles may be or include, but are not limited to, copper particles, silver particles, gold particles, aluminum particles, magnesium particles, manganese particles, iron particles, nickel particles, zinc particles, tin particles, platinum particles, palladium particles, or the like, or any combination thereof. The metal particles may be or include nanoparticles having a diameter of from about 10 nm to about 100 nm. The metal particles may also be or include microparticles having a diameter greater than about 100 nm. The metal particles may be prepared separately and incorporated into the 3D printable composition. The metal particles may also be prepared or synthesized in situ.

Illustrative catalysts for the one or more metal precursors maybe or include, but are not limited to, one or more metals (e.g., metal particles) capable of catalyzing or facilitating electroless plating.

The one or more metal precursors may be present in the composition in an amount of from about 0.1 weight % to about 95 weight %, based on a total weight of the composition. For example, the one or more metal precursors may be present in the 3D printable composition in an amount of from greater than or equal to about 0.1 weight %, greater than or equal to about 0.5 weight %, greater than or equal to about 1 weight %, greater than or equal to about 5 weight %, greater than or equal to about 10 weight %, greater than or equal to about 20 weight %, greater than or equal to about 30 weight %, greater than or equal to about 40 weight %, or more. In another example, the one or more metal precursors may be present in the 3D printable composition in an amount of less than or equal to about 95 weight %, less than or equal to about 90 weight %, less than or equal to about 80 weight %, less than or equal to about 70 weight %, less than or equal to about 65 weight %, less than or equal to about 50 weight %, or less.

The one or more 3D printable materials may be or include any material or substance suitable for, capable of, or configured to be utilized in the one or more 3D printing processes. The one or more 3D printable materials may also be or include any material or substance suitable for, capable of, or configured to contain the one or more metal precursors. For example, the one or more 3D printable materials are compatible with the one or more 3D printing processes and the one or more metal precursors. For example, the one or more 3D printable materials may react with or may not react with at least one of the metal precursors. In at least one embodiment, the 3D printable materials may be or include, but is not limited to, a thermoplastic polymer, a non-crosslinked polymer, a resin (e.g., a monomer resin, an oligomer resin, etc.), or the like, or any combination thereof.

In at least one embodiment, the 3D printable material may include a polymer that swells by less than 10 wt % in an aqueous solution or an electroless plating bath. For example, the 3D printable material may be or include a polymer that swells by less than 10 wt %, less than 8 wt %, less than 7 wt %, less than 6 wt %, less than 5 wt %, less than 4 wt %, less than 3 wt %, or less than 2 wt % in an aqueous solution or an electroless plating bath. The 3D printable material may be water insoluble.

Illustrative 3D printable materials may be or include, but are not limited to, acrylonitrile butadiene styrene (ABS), polylactic acid (PLA), thermoplastic polyurethane (TPU), polystyrene (e.g., high impact polystyrene (HIPS)), polypropylene (PP), polyethylene (PE), ethylene vinyl acetate (EVA), thermoplastic polyolefin (TPO), rubber, nylon, polycaprolactone (PCL), polyethylene terephthalate (PET), polyethylene terephthalate glycol (PTG), polyamide, aromatic polyamide, polyether, polyester, polymethylmethacrylate (PMMA), polyurethane copolymers, ethylene vinyl alcohol, or the like, or any combination thereof.

The one or more 3D printable materials may be present in the composition in an amount of from about 5 weight % to about 99.9 weight %, based on a total weight of the composition. For example, the one or more 3D printable materials may be present in the composition in an amount of from greater than or equal to about 5 weight %, greater than or equal to about 10 weight %, greater than or equal to about 15 weight %, greater than or equal to about 20 weight %, greater than or equal to about 25 weight %, greater than or equal to about 30 weight %, greater than or equal to about 35 weight %, greater than or equal to about 40 weight %, greater than or equal to about 45 weight %, greater than or equal to about 50 weight %, greater than or equal to about 55 weight %, greater than or equal to about 60 weight %, greater than or equal to about 65 weight %, greater than or equal to about 70 weight %, greater than or equal to about 75 weight %, or more, based on a total weight of the 3D printable composition. In another example, the one or more 3D printable materials may be present in the composition in an amount of less than or equal to about 99.9 weight %, less than or equal to about 95 weight %, less than or equal to about 90 weight %, less than or equal to about 85 weight %, less than or equal to about 80 weight %, less than or equal to about 75 weight %, less than or equal to about 70 weight %, less than or equal to about 65 weight %, less than or equal to about 60 weight %, less than or equal to about 55 weight %, less than or equal to about 50 weight %, less than or equal to about 40 weight %, less than or equal to about 30 weight %, less than or equal to about 20 weight %, or less, based on a total weight of the 3D printable composition.

Methods

Embodiments of the present disclosure may provide methods for preparing any one or more of the 3D printable compositions disclosed herein. For example, embodiments of the present disclosure may provide methods for preparing a 3D printable composition including one or more 3D printable materials having one or more metal precursors suspended, dissolved, mixed, or otherwise dispersed therein. The method may include combining, mixing, or otherwise contacting the one or more metal precursors, the one or more 3D printable materials, and one or more solvents with one another. The one or more metal precursors, the one or more 3D printable materials, and the one or more solvents may be contacted with one another to prepare a solution or mixture. The one or more metal precursors, the one or more 3D printable materials, and the one or more solvents may be mixed or rheologically mixed. In at least one embodiment, the one or more metal precursors may include copper (II) acetylacetonate and the one or more 3D printable materials may include polylactic acid (PLA).

The solvent utilized for preparing the 3D printable composition may be a single solvent or a co-solvent system. In at least one embodiment, the one or more solvents include a co-solvent system including dichloromethane and acetone. It should be appreciated, however, that any suitable solvent capable of dissolving or solvating the 3D printable materials may be utilized. Further, any suitable solvent capable of dissolving, suspending, or dispersing the one or more metal precursors may be utilized. For example, the one or more solvents that may be utilized may be or include those having similar polar structures to the 3D printable materials. Illustrative solvents may be or include, but is not limited to, dimethylformamide, N-methyl-2-pyrrolidone, tetrahydrofuran, dichloromethane, acetone, fluorocarbon, dimethyl sulfoxide, or the like, or combinations thereof.

The method for preparing the 3D printable composition may also include evaporating at least a portion of the one or more solvents from the solution or mixture to prepare the 3D printable composition including the one or more metal precursors and the one or more 3D printable materials. In at least one embodiment, the solution or mixture may be cast on a substrate before evaporating at least a portion of the one or more solvents from the solution or mixture to prepare a sheet or film of the 3D printable composition. In at least one embodiment, the method may further include homogenizing the composite 3D printable composition. Homogenizing the 3D printable composition may include applying heat and/or compression to the 3D printable composition. It should be appreciated that the heat may soften or melt the one or more polymers of the 3D printable composition. It should further be appreciated that compression of the 3D printable composition may generate shear to break aggregations of the metal precursor and facilitate or aid in the dispersion of the metal precursor in the one or more polymers.

The method for preparing the 3D printable composition may include one or more shaping and/or sizing processes. For example, the method for preparing the 3D printable composition may include shaping and/or sizing the 3D printable composition for one or more 3D printing processes. For example, the 3D printable composition may be milled, granulated, ground, cut, or the like, or any combination thereof to prepare particles, granules, powders, and/or agglomerations of the 3D printable composition for one or more 3D printing processes (e.g., powder bed 3D printing). In another embodiment, the 3D printable composition may be extruded or spun to prepare filaments or strands of the 3D printable composition for one or more 3D printing processes (e.g., fused deposition modeling).

Methods disclosed herein may include fabricating a 3D printed article from the 3D printable compositions disclosed herein. For example, the 3D printable compositions disclosed herein may be utilized in any one or more 3D printing processes to fabricate the 3D printed article (e.g., a nonconductive 3D printed article). Illustrative 3D printing processes may be or include, but are not limited to, an extrusion-based 3D printing process or material extrusion, vat polymerization, powder bed fusion, material jetting, binder jetting, or the like. Illustrative extrusion-based 3D printing processes may be or include, but are not limited to, fused deposition modeling (FDM), melted extrusion manufacturing (MEM), fused filament fabrication (FFF), selective deposition modeling (SDM), or the like, or combinations thereof. Illustrative vat polymerization 3D printing processes may be or include, but are not limited to, stereolithography (SL), direct light processing (DLP), or the like, or combinations thereof. Illustrative powder bed fusion 3D printing processes may be or include, but are not limited to, selective laser sintering (SLS), or the like. Illustrative material jetting 3D printing processes may be or include, but are not limited to, material jetting (MJ), drop on demand (DOD), or the like, or combinations thereof.

FIG. 1 illustrates a schematic of an exemplary system 100 for fabricating an article 102 (e.g., a nonconductive 3D printed article) from the one or more 3D printable compositions disclosed herein via the 3D printing processes, according to one or more embodiments. The system 100 may include a computer aided design (CAD) assembly 104 and a layering device 106. The CAD assembly 104 may include any software capable of providing or generating a geometry or digital model 108 of the article 102 in three dimensions (3D). As further described herein, the layering device 106 may utilize the digital model 108 as a template or guide to fabricate the article 102 in a layer-by-layer manner. The layering device 106 may be or include any device (e.g., 3D printer) capable of fabricating the article 102 using the digital model 108 as a template.

The CAD assembly 104 may include at least one computer 110 having a memory 112 (e.g., hard drives, random access memory, flash memory, etc.), one or more central processing units (one is shown 114), one or more input devices (e.g., keyboard and mouse) (not shown), one or more monitors 116 on which a software application may be executed, or any combination thereof. The memory 112 may store an operating system and/or any programs or software capable of providing or generating the digital model 108. The central processing unit 114 may work in concert with the memory 112 and/or the input devices (not shown) to perform tasks for a user or operator. The central processing unit 114 may be automated or may execute commands at the direction of the user. The computer 110 may interface with one or more databases, support computers or processors, the Internet, or any combination thereof. It may be appreciated that the term "interface" may refer to all possible internal and/or external interfaces, wired or wireless. While FIG. 1 illustrates the computer 110 as a platform on which the methods discussed and described herein may be performed, the methods may also be performed on any other platform or device having computing capabilities. For example, the layering device 106 may include a platform or device capable of generating the digital model 108, such that a separate computer 110 may not be necessary.

The digital model 108 may include information or data defining one or more portions of the article 102. For example, the digital model 108 may include 3D numerical coordinates of an entire geometry of the article 102. The digital model 108 may define an inner surface, an outer surface, and/or a volume of the article 102 to be fabricated by the layering device 106. The digital model 108 may be communicated to the layering device 106, as illustrated by arrow 118, and may provide the template to fabricate the article 102.

The layering device 106 may fabricate the article 102 from the digital model 108 in one or more processes (two are shown 120, 122). A first process 120 for fabricating the article 102 from the digital model 108 may be or include a digital process. The digital process 120 may include dividing or partitioning the digital model 108 into two or more digital layers or digital cross-sections (two are shown 124, 126) using one or more digital horizontal planes (one is shown 128). For example, as illustrated in FIG. 1, the digital process 120 may include partitioning the digital model 108 into successive digital cross-sections 124, 126, which may be two dimensional (2D) or 3D. It may be appreciated that the layering device 106 may divide or partition the digital model 108 into any number of digital cross-sections 124, 126 using any number of digital horizontal planes 128. It should further be appreciated that each digital cross-section 124, 126 may also be divided or partitioned into two or more sublayers and/or sections. Each of the digital cross-sections 124, 126 may provide a template to fabricate at least a portion of the article 102. For example, as illustrated in FIG. 1, each of the digital cross-sections 124, 126 may provide a template to fabricate each of the layers 130, 132 of the article 102 in a second process 122. The digital cross-sections 124, 126 may include data defining the respective layers 130, 132 of the article 102. For example, a first digital cross-section 124 may include data defining a first layer 130 of the article 102, and a second digital cross-section 126 may include data defining a second layer 132 of the article 102. Each of the digital cross-sections 124, 126 may include data defining an outer cross-sectional line, an inner cross-sectional line, a cross-sectional area, a volume, or any combination thereof. The respective inner and outer cross-sectional lines of each of the digital cross-sections 124, 126 may define respective inner and outer surfaces of each of the layers 130, 132 of the article 102. Further, the respective cross-sectional area of each of the digital cross-sections 124, 126 may at least partially define a respective volume of each of the layers 130, 132.

As previously discussed, the layering device 106 may fabricate the article 102 from the digital model 108 in one or more processes 120, 122, and the digital process 120 may include partitioning the digital model 108 into the digital cross-sections 124, 126. The second process 122 for fabricating the article 102 from the digital model 108 may include fabricating each of the layers 130, 132 of the article 102 from a stock or building material, such as the 3D printable composition disclosed herein. For example, the second process 122 may include sequentially forming each of the layers 130, 132 of the article 102 using the respective digital cross-sections 124, 126 as a template. The second process 122 may also include binding the layers 130, 132 with one another to build or form the article 102. Any number of layers 130, 132 may be formed and/or bound with one another to form the article 102.

In an exemplary operation, illustrated in FIG. 1, the layering device 106 may fabricate the article 102 by forming the first layer 130, forming the second layer 132, and combining or binding the first and second layers 130, 132 with one another. The first layer 130 may be formed on a substrate (not shown) configured to support the first layer 130 and/or any subsequent layers. Any one or more of the layers 130, 132 formed by the layering device 106 may provide or be a substrate for any subsequent layers deposited by the layering device 106. For example, the first layer 130 deposited by the layering device 106 may be or provide the substrate for the second layer 132 or any subsequent layers. In at least one embodiment, the formation of the second layer 132 and the binding of the second layer 132 to the first layer 130 may occur simultaneously. For example, the process of forming the second layer 132 may at least partially bind the second layer 132 to the first layer 130. In another embodiment, the formation of the second layer 132 and the binding of the second layer 132 with the first layer 130 may occur sequentially. For example, the second layer 132 may be formed adjacent or atop the first layer 130 in one process, and the second layer 132 may be bound, fused, or otherwise coupled with the first layer 130 in a subsequent process (e.g., a heating process). The layering device 106 may bind or fuse the first layer 130, the second layer 132, and/or any subsequent layers (not shown) with one another to fabricate the article 102.

Figure 2:
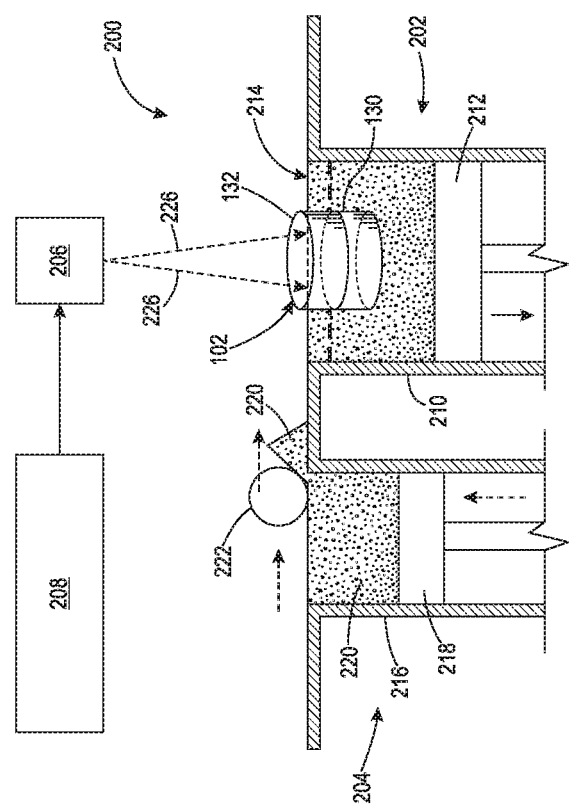
FIG. 2 illustrates an exemplary layering device that may be utilized in the system of FIG. 1, according to one or more embodiment disclosed.

FIG. 2 illustrates an exemplary layering device 200 that may be utilized in the system 100 of FIG. 1, according to one or more embodiments. The layering device 200 may be capable of or configured to form and/or bind the layers 130, 132 (see FIG. 1) with one another to form the article 102. The layering device 200 may also be capable of or configured to carry out or perform a powder bed fusion 3D printing process, such as selective laser sintering (SLS), or the like, and/or a modification thereof. As illustrated in FIG. 2, the layering device 200 may include a fabrication assembly 202, one or more powder assemblies (one is shown 204), a scanner 206, a heat source 208, such as a laser, or any combination thereof.

As illustrated in FIG. 2, the fabrication assembly 202 may include a feedstock or powder container 210 configured to contain a build material 220 (e.g., the 3D printable composition in a powdered or granulated form) and having a component support 212 disposed therein. The component support 212 may be configured to carry or hold the article 102 during one or more fabrication processes of the layering device 200. The component support 212 may be adjustable or movable within the build container 210 in a vertical direction (e.g., z-axis) and may be movable to define a working volume 214 (shown in phantom) of the layering device 200.

The powder assembly 204 may include a powder chamber 216 having a delivery support 218 configured to support the 3D printable composition 220. The delivery support 218 may be adjustable or movable within the powder chamber 216 in the vertical direction (e.g., z-axis). The powder assembly 204 may also include a roller or wiper 222 configured to transfer at least a portion of the build material or 3D printable composition 220 from the powder assembly 204 to the fabrication assembly 202. While FIG. 2 illustrates a single powder assembly 204, it should be appreciated that the layering device 200 may include a plurality of powder assemblies. For example, the layering device 200 may include a first powder assembly capable of or configured to contain and deliver the 3D printable material to the fabrication assembly, and a second powder assembly capable of or configured to contain and deliver the metal precursors or another 3D printable material to the fabrication assembly. In another example, the layering device 200 may include a first powder assembly capable of or configured to contain and deliver the 3D printable composition including the 3D printable material and the metal precursor to the fabrication assembly, and a second powder assembly capable of or configured to contain and deliver a 3D printable material without the metal precursors to the fabrication assembly.

In at least one embodiment, the scanner 206 may focus or direct an energy beam or any heat source, illustrated by arrows 226, along the working volume 214 to fuse the 3D printable composition 220 contained in the working volume 214 with one another to form the layers 130, 132 of the article 102. In another embodiment, the laser 208 or another heat source may be translated or moved along an x-axis and/or a y-axis to direct the energy beam 226 thereof along the working volume 214. For example, the laser 208 may be mounted with a movable platform or frame (not shown) configured to translate the laser 208 along the x-axis and/or the y-axis.

In an exemplary operation of the layering device 200 with continued reference to FIG. 2, the delivery support 218 may be raised in the vertical direction to supply a portion of the 3D printable composition 220 disposed in the powder chamber 216 to the wiper 222, and the component support 212 may be lowered to provide an empty volume (i.e., the working volume 214) in the build container 210. The wiper 222 may spread or otherwise push the portion of the 3D printable composition 220 from the powder assembly 204 to the empty volume in the build container 210 to thereby form the working volume 214 of the 3D printable composition 220 in the fabrication assembly 202. The laser 208, the scanner 206, and/or another heat source may emit or otherwise focus the energy beam 226 onto the 3D printable composition 220 contained in the working volume 214 to selectively melt, sinter, or otherwise fuse at least a portion of the powdered 3D printable composition 220 with one another to form the first layer 130 of the article 102. For example, the energy beam 226 may selectively melt or fuse the powdered 3D printable composition 220 into larger structures or agglomerations (e.g., molten materials) by rapidly melting the powdered 3D printable composition 220. As the energy beam 226 moves along the working volume 214 to melt or fuse the powdered 3D printable composition 220, heat may be conducted from the previously melted or molten region of the working volume 214 to thereby rapidly cool and solidify the molten powdered 3D printable composition 220. After forming the first layer 130 of the article 102 at least a portion of the powdered 3D printable composition 220 in the working volume 214 may be melted or bound to one another and another portion of the powdered 3D printable composition 220 may be unmelted or unbound to one another.

After forming the first layer 130 of the article 102, the component support 212 may be lowered to thereby lower the first layer 130 of the article 102, and the delivery support 218 may be raised to supply another portion of the powdered 3D printable composition 220 from the build container 216 to the wiper 222. The wiper 222 may spread the portion of the powdered 3D printable composition 220 from the powder assembly 204 to the build container 210 to thereby form another working volume 214 of the powdered 3D printable composition 220 in the fabrication assembly 202. The laser 208 may emit the energy beam 226 onto the powdered 3D printable composition 220 forming the working volume 214 to selectively melt at least a portion of the powdered 3D printable composition 220 into the larger structures or agglomerations (e.g., the molten powdered materials). Heat may be conducted from the previously molten region of the working volume 214 to thereby rapidly cool and solidify the molten powdered 3D printable composition 220 to form the second layer 132 (shown in phantom) of the article 102. The fabrication process may be repeated to build the successive layers 130, 132 of the article 102. As previously discussed, the formation of the second layer 132 may bind or couple the second layer 132 with the first layer 130. Further, as previously discussed, the second layer 132 may be coupled with the first layer 130 in a subsequent process (e.g., a heating and/or pressing process).

Figure 3:
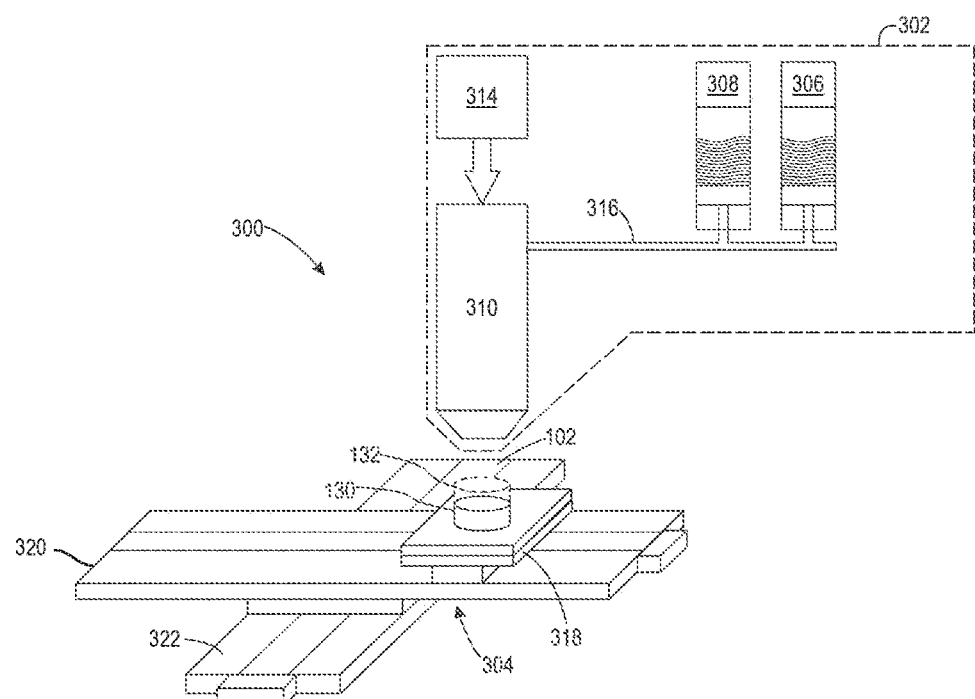
FIG. 3 illustrates an exemplary layering device that may be utilized in the system of FIG. 1, according to one or more embodiments.

FIG. 3 illustrates an exemplary layering device 300 that may be utilized in the system 100 of FIG. 1, according to one or more embodiments. The layering device 300 may be configured to form and/or bind the layers 130, 132 of the article 102 (see FIG. 1) with one another to form the article 102. For example, the layering device 300 may be configured to deposit successive layers 130, 132 of the one or more 3D printable compositions onto a substrate 318 and/or any one or more of the layers 130, 132 of the article 102, and bind the layers 130, 132 with one another to form the article 102.

As illustrated in FIG. 3, the layering device 300 may include a fabrication assembly 302 and a stage 304 (e.g., an x, y-axis stage). The fabrication assembly 302 may include one or more feeders (two are shown 306, 308), one or more deposition nozzles (one is shown 310), a gas supply or feeding assembly 312 configured to deliver the build material from the feeders 306, 308 to the deposition nozzle 310, a heat source (e.g., laser) 314, or any combination thereof. In at least one embodiment, each of the feeders 306, 308 may be configured to retain and dispense one or more of the 3D printable compositions used to fabricate the article 102. For example, a first feeder 306 may contain a first material, such as a first 3D printable composition, used to fabricate the article 102 and may further be configured to deliver the first 3D printable composition to a conduit 316 fluidly coupled therewith. Similarly, a second feeder 308 may contain a second material, such as a second 3D printable composition, used to fabricate the article 102 and may further be configured to deliver the second 3D printable composition to the conduit 316 fluidly coupled therewith. In at least one embodiment, at least one of the feeders 306, 308 may be capable of or configured to retain and dispense one or more support materials for fabricating the article 102. For example, one of the feeders 306, 308 may be capable of or configured to retain and dispense a support material that is capable of or configured to provide a temporary support for supporting or positioning at least a portion of the article 102 during and/or post fabrication. The support material may be used to build support structures for areas or portions of the article 102 during fabrication and may assure adequate vertical placement of subsequent layers of the article 102, for example, in cases where the article 102 includes an overhanging feature or shapes having negative angles, voids, or the like. It should be appreciated that the support material may not include the one or more metal precursors, and may be removed after fabrication to reveal a final shape of the article 102. For example, the support material may be or include a water soluble polymer and the 3D printable composition may include a water insoluble polymer; and upon fabricating the article 102, the support material and the supports fabricated therefrom may be removed by contacting the article 102 with water. In yet another embodiment, at least one of the feeders 306, 308 may be capable of or configured to retain and dispense a 3D printable material without the metal precursors to fabricate portions of the article 102 where conductivity is not desired.

In an exemplary operation of the layering device 300, the first material and/or the second material (e.g., 3D printable composition or support material) may be dispensed from the first feeder 306 and/or the second feeder 308, respectively, at a controlled rate. The first feeder 306 and/or the second feeder 308 may deliver the first and/or second materials, respectively, with the aid of the feeding assembly 312 to the deposition nozzle 310 via the conduit 316. The first and/or second materials may be dispensed from the deposition nozzle 310 and melted by the laser 314, an energy beam thereof, or any heat source to form a first molten material and/or a second molten material, and the first and/or the second molten materials may be deposited onto the substrate 318 to form each of the layers 130, 132 of the article 102. It should be appreciated that the deposition nozzle 310 may also be heated to melt the first and/or second materials, thereby omitting the laser 314. The dispensing of the first and/or second materials from the deposition nozzle 310, the melting of the first and/or second materials by the laser 314, and/or the deposition of the molten first and/or the second molten material may occur substantially simultaneously or sequentially.

As the first and second materials (e.g., 3D printable composition or support material) are deposited, the stage 304 may be translated or moved in a desired pattern to form each of the layers 130, 132 of the article 102. The desired pattern may be determined, at least in part, by the digital model 108 (see FIG. 1). The stage 304 may be configured to move the substrate in at least two dimensions. For example, the stage 304 may include an X-axis track 320 and a Y-axis track 322 configured to move the substrate 318 along an X-axis and a Y-axis, respectively. In at least one embodiment, the deposition nozzle 310 and/or the stage 304 may be configured to move along a Z-axis. For example, the stage 304 may be configured to move along the Z-axis to raise or lower the substrate 318 relative to the deposition nozzle 310. While FIG. 3 illustrates the stage 304 as having the X-axis track 320 and the Y-axis track 322, it should be appreciated that in another embodiment, the stage 304 may be stationary, and the deposition nozzle 310 may move relative to the substrate 318 and the stage 304.

Figure 4:
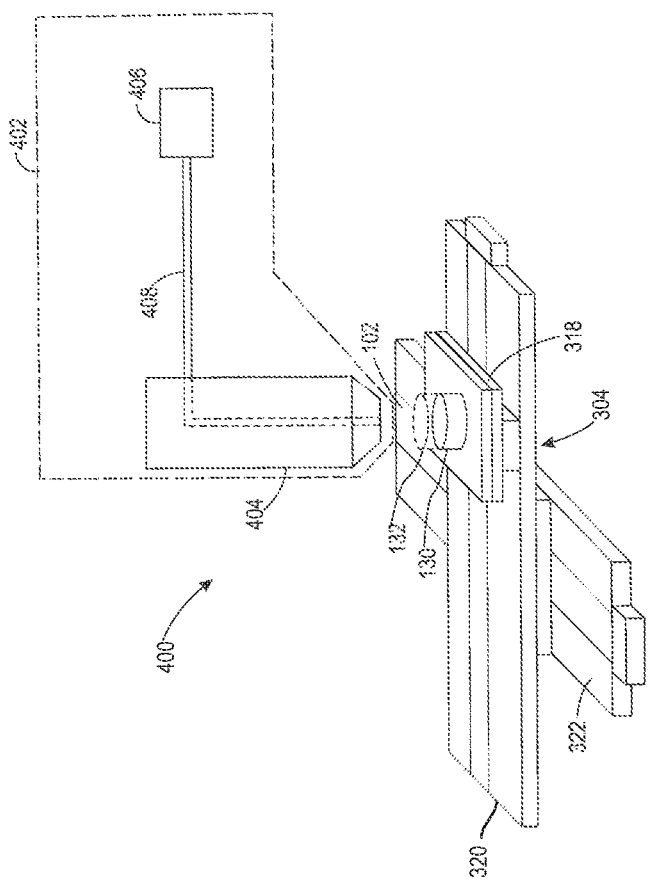
FIG. 4 illustrates another exemplary layering device 400 that may be utilized in the system of FIG. 1, according to one or more embodiments disclosed.

FIG. 4 illustrates another exemplary layering device 400 that may be utilized in the system 100 of FIG. 1, according to one or more embodiments. The layering device 400 may be similar in some respects to the layering device 300 described above and therefore may be best understood with reference to the description of FIG. 3 where like numerals may designate like components and will not be described again in detail.

The layering device 400 may be capable of or configured to deposit successive layers 130, 132 of the article 102, and bind the layers 130, 132 with one another to form the article 102. As illustrated in FIG. 4, the layering device 400 may include a fabrication assembly 402 and a stage 304 (e.g., an x, y-axis stage). The fabrication assembly 402 may include one or more deposition nozzles (one is shown 404) and at least one feeding assembly 406 associated with or operably coupled with the respective deposition nozzle 404. The feeding assembly 406 may retain the one or more of the 3D printable compositions and dispense the 3D printable compositions to the deposition nozzle 404 operably coupled therewith. For example, as illustrated in FIG. 4, the feeding assembly 406 may retain the 3D printable composition in the form of a filament 408 and dispense the filament 408 to the deposition nozzle 404. The deposition nozzle 404 may include a heat source capable of or configured to heat the filament 404 from the feeding assembly 406 to melt the filament 404, extrude the molten or melted filament 404, and deposit the filament 404 on the stage 304. While only one deposition nozzle 404 and one feeding assembly 406 is illustrated in FIG. 4, it should be appreciated that the layering device 400 may include any number of deposition nozzles 404 and feeding assemblies 406.

In at least one embodiment, a first deposition nozzle and a first feeding assembly associated with the first deposition nozzle may be capable of or configured to deposit a first 3D printable composition on the stage 304, and a second deposition nozzle and a second feeding assembly associated with the second deposition nozzle may be capable of or configured to deposit a second 3D printable composition on the stage 304. In another embodiment, a first deposition nozzle and a first feeding assembly associated with the first deposition nozzle may be capable of or configured to deposit a first 3D printable composition on the stage 304, and a second deposition nozzle and a second feeding assembly associated with the second deposition nozzle may be capable of or configured to deposit the support material on the stage 304. In yet another embodiment, a first deposition nozzle and a first feeding assembly associated with the first deposition nozzle may be capable of or configured to deposit the 3D printable composition on the stage 304, and a second deposition nozzle and a second feeding assembly associated with the second deposition nozzle may be capable of or configured to deposit a 3D printable material without the metal precursor on the stage 304.

In an exemplary operation of the layering assembly 400 with continued reference to FIG. 4, the feeding assembly 406 may retain the 3D printable composition in the form of a filament 408 and deliver the 3D printable composition to the deposition nozzle 404. The deposition nozzle 404 may receive the filament 408 from the feeding assembly 406, melt the filament 408, and deposit the melted filament 408 on the substrate 318 to form each of the layers 130, 132 of the article 102. As the melted filament 408 is deposited, the stage 304 may be translated or moved in a desired pattern to form each of the layers 130, 132 of the article 102. The desired pattern may be determined, at least in part, by the digital model 108 (see FIG. 1). The stage 304 may be configured to move the substrate in at least two dimensions as discussed above. While FIG. 4 illustrates the stage 304 as having the X-axis track 320 and the Y-axis track 322, it should be appreciated that in another embodiment, the stage 304 may be stationary, and the deposition nozzle 404 may move relative to the substrate 318 and the stage 304.

As described above, the 3D printable composition including the one or more metal precursors and the 3D printable materials may be utilized in various 3D printing processes to fabricate the article 102. It should be appreciated that the article 102 fabricated by any one of the 3D printing processes described herein may be a non-conductive article 102. It should further be appreciated that the article 102 fabricated according to any one or more of the methods disclosed herein may include at least one portion fabricated from the 3D printable composition including the 3D printable material and the metal precursor, at least one portion fabricated from a support material (e.g., water soluble material), at least one portion fabricated from a 3D printable material not including the metal precursor, or any combination thereof. As further described herein, the present disclosure may provide methods for treating and/or processing the non-conductive article 102 to produce a 3D printed conductive article. As used herein, the term or expression "3D printed conductive article" may refer to any article fabricated via a 3D printing or additive manufacturing process, where at least a portion of the article is conductive, and where the conductivity is provided by an electroless plating process.

The method for treating and/or processing the 3D printed non-conductive article to produce the 3D printed conductive article may include an electroless plating process or a modification thereof. In at least one embodiment, the method for treating and/or processing the 3D printed non-conductive article to produce a 3D printed conductive article may include activating the one or more metal precursors disposed, dispersed, or otherwise contained in the 3D printed non-conductive article, depositing metal or plating metal on and/or about the one or more activated metal precursors, or any combination thereof.

In at least one embodiment, activating the one or more metal precursors may include chemically reducing the one or more metal precursors with an activation solution. For example, activating the one or more metal precursor may include contacting the precursors with an activation solution including one or more reducing agents to reduce any metal ions of the one or more metal precursors to metal (e.g., metal particles). For example, the one or more metal precursors may be or include copper (II) acetylacetonate ($Cu(O_2C_5H_7)_2$), and activating the copper (II) acetylacetonate may include contacting the copper (II) acetylacetonate with the reducing agent to reduce the copper cation to copper metal, such as copper metal particles. Illustrative reducing agents may be or include, but are not limited to, aldehydes, such as formaldehyde, hypophosphites (e.g., sodium hypophosphite or potassium hypophosphite salt), dimethylamine borane (DMAB), amine borane, trimethylamine borane, ascorbic acid, hydrazine, sodium borohydride, or any other water soluble reducing agent, or the like, or any combination thereof. The one or more reducing agents may be provided as an aqueous solution. For example, the reducing agent may be dissolved, mixed, or otherwise contacted with water to prepare an aqueous solution, and the aqueous solution of the reducing agent may then be contacted with the one or more metal precursors of the 3D printed non-conductive article to activate the one or more metal precursors. It should be appreciated that the aqueous activation solution may also be utilized to solvate or dissolve any supporting material (e.g., water soluble polymer) contained in the 3D printed article. The activation solution may be commercially obtained.

In at least one embodiment, depositing metal or plating metal on and/or about the one or more activated metal precursors may include contacting the activated metal precursors contained in the 3D printed non-conductive article with a deposition solution. As used herein, the term or expression "deposition solution," "electroless deposition solution," "metal plating solution or bath," or the like may refer to a solution capable of or configured to facilitate electroless metal deposition on a surface upon contact with the surface. Contacting the activated metal precursors with the deposition solution may form electrically-conductive deposits and/or layers on and/or about the 3D printed non-conductive article to thereby produce the 3D printed conductive article. For example, contacting the activated metal precursors with the deposition solution may form one or more electrically-conductive layers on and/or about an outer surface of the 3D printed non-conductive article to thereby produce the 3D printed conductive article. The deposition solution may be commercially obtained.

In at least one embodiment, the deposition solution may include one or more metal ions or salts thereof, one or more complexing agents, one or more reducing agents, one or more pH modifying agents (e.g., acids, bases, buffers), one or more initiators and/or stabilizers, or any combination thereof. Illustrative metal salts may be or include, but are not limited to, water soluble salts of copper, silver, gold, aluminum, magnesium, manganese, iron, nickel, zinc, tin, platinum, palladium, or the like, or any combination thereof. For example, the one or more metal salts may be or include copper (II) sulfate pentahydrate ($CuSO_4.5H_2O$), nickel chloride, copper bromide, or any other water-soluble metal salt, such as those already disclosed herein, or the like, or any combination thereof. Illustrative complexing agents may be or include, but are not limited to, ethylenediaminetetraacetic acid (EDTA) disodium salt, citrates, phosphates, succinates, or the like, or any combination thereof. For example, the complexing agent may include EDTA. Illustrative reducing agents may be or include, but are not limited to, aldehydes, such as formaldehyde, hypophosphites (e.g., sodium hypophosphite or potassium hypophosphite salt), dimethylamine borane (DMAB), amine borane, trimethylamine borane, or the like, or any combination thereof. Illustrative pH modifying agents may be or include acids, bases, buffers, or any combination thereof. For example, the pH modifying agents may be or include sodium hydroxide, sodium acetate, Rochelle salt, or the like, or combinations thereof. Illustrative initiators and/or stabilizers may be or include, but are not limited to, thiourea, cations of lead, calcium, thallium, a source of iron ions, such as potassium ferrocyanide, each of which may be capable of or configured to improve the stability of the deposition solution.

The 3D printed compositions disclosed herein may be utilized in any 3D printing process to fabricate any 3D printed conductive article where at least a portion of the 3D printed conductive article is conductive. Illustrative 3D printed conductive article that may be fabricated with the 3D printable composition and methods described herein may be or include, but are not limited to, electrical terminals, vertical interconnects, printed circuits, devices or consumer electronics or components thereof, biomedical devices or components thereof, aerospace devices or components thereof, devices or components related to the defense industry, flexible electronics, sensors and/or devices for the Internet of Things (IOT), components thereof, or the like, or any combination thereof.

The 3D printed conductive article fabricated from the 3D printable composition and methods disclosed herein may have a resistivity and conductivity similar to a bulk metal. For example, the 3D printed conductive articles fabricated with the 3D printable composition and according to the methods disclosed herein may have a resistivity and conductivity similar to bulk copper. For example, the 3D printed conductive article fabricated with the 3D printable composition may have a conductivity of greater than or equal to about 1E6 Siemens per meter (S/m), greater than or equal to about 1E7 S/m, greater than or equal to about 1E8 S/m, greater than or equal to about 1E9 S/m, greater than or equal to about 1E10 S/m, or greater.

In at least one embodiment, the method may include tuning, modifying, or adjusting the conductivity and/or resistivity of the 3D printed conductive article. For example, as further described herein, it has been surprisingly and unexpectedly discovered that the surface morphology, such as smoothness or roughness of the surface, may at least partially determine the resistivity and/or conductivity of the 3D printed conductive article. As such, the surface morphology of the 3D printed conductive article may be modified to increase or decrease the resistivity and/or conductivity thereof. In at least one example, the 3D printed conductive article may be fabricated with a relatively smoother surface to reduce or decrease the resistance or resistivity thereof. In another example, the 3D printed article may be fabricated with a relatively rougher surface or a surface with more artifacts to increase the resistance or resistivity thereof.

Embodiments of the present disclosure may provide a kit for use in an additive manufacturing or 3D printing process. The kit may include any one or more of the 3D printable compositions disclosed herein, an activation solution including one or more reducing agents, a deposition solution, a 3D printable support composition (e.g., water soluble 3D printable filament, powder, or resin), a 3D printable material without metal precursors, a 3D printer, instructions to use any one of the foregoing, or any combination thereof. Any one or more of the components of the kit may be packaged together with another one or more of the components. Any one or more of the components of the kit may also be packaged individually or separately. Suitable packaging material may include water and/or gas impermeable materials to protect or prevent degradation to one or more components of the kit. For example, the 3D printable support composition and/or the 3D printable compositions may be individually packaged in water and gas impermeable materials to prevent degradation as the 3D printable support composition and/or the 3D printable compositions may be hygroscopic, hydrophilic, and/or hydrolytic.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

An exemplary 3D printable composition including a 3D printable material and a metal precursor was produced. To produce the 3D printable composition, a homogenous mixture including a 3D printable material, particularly, a polymer, a metal precursor and a solvent was prepared. To prepare the homogenous mixture, about 6.4 grams (g) of a water insoluble polymer, namely, polylactic acid (PLA) was placed into a vessel. About 1.6 (g) of the metal precursor, copper (II) acetylacetonate ($Cu(O_2C_5H_7)_2$), was then contacted or combined with the PLA. A cosolvent including about 50 mL of dichloromethane and 100 mL of acetone was then added to the vessel and stirred for about 30 minutes (min) until the PLA was completely dispersed, thereby preparing the homogenous mixture.

The homogenous mixture was then cast onto a substrate and placed in a fume hood for about 3 hours (h) to allow the cosolvent to evaporate. Once the cosolvent was evaporated, a dried sheet including a mixture of the metal precursor and the PLA was obtained. The dried sheet was further homogenized by heat and compression. Particularly, the dried sheet was folded and compressed under heating multiple times. After exposing the dried sheet to compression and heat, the resulting homogenized dried sheet was utilized to prepare the exemplary 3D printable composition. Particularly, the exemplary 3D printable composition was extruded into a 3D printable composition in the form of a filament or 3D printable filament. While a 3D printable filament was prepared, it is contemplated that other morphologies (e.g., shapes and/or sizes) may be utilized, as discussed above. For example, the exemplary 3D printable composition may be milled into a 3D printable composition in the form of a powder or granules or 3D printable powder, which may be utilized in a powder bed fusion 3D printing process or a powder bed laser sintering 3D printing process.

Example 2

The 3D printable composition (i.e., the 3D printable filament) prepared in Example 1 was processed and treated to produce a 3D printed conductive article. To produce the 3D printed conductive article, an article (i.e., a non-conductive article) was 3D printed onto a substrate with the 3D printable filament via a fused deposition modeling (FDM) 3D printing process, and the 3D printed non-conductive article was subsequently treated or processed to produce the 3D printed conductive article.

To process the 3D printed non-conductive article to the conductive article, an activation solution or chemical reducing bath and a metal plating bath or deposition solution were prepared. To prepare the chemical reducing bath, about 0.6 g of dimethylamine borane (DMAB) and about 100 mL of deionized water were combined with one another. To prepare the metal plating bath, about 1 L of deionized water, about 18 grams of copper (II) sulfate pentahydrate ($CuSO_4 \cdot 5H_2O$), about 61.13 g of ethylenediaminetetraacetic acid (EDTA) disodium salt, and about 57.3 mg of potassium ferrocyanide were combined with one another to prepare a mixture. Sodium hydroxide was then added to the mixture until a pH of about 12.8 was obtained. The metal plating bath was then combined with a 37% formaldehyde solution in a volume ratio (v/v) of about 50:1.

To produce the 3D printed conductive article, the 3D printed non-conductive article was placed in the reducing bath or activation solution and kept overnight to activate the metal precursor dispersed therein. It should be appreciated that contacting the metal precursor, copper (II) acetylacetonate, with the reducing bath reduces the copper (II) acetylacetonate to copper metal particles. After contacting the copper (II) acetylacetonate with the reducing bath overnight, the 3D printed non-conductive article was washed with deionized water and dried. After drying, the 3D printed non-conductive article was placed in the metal plating bath and maintained in the metal plating bath or the deposition solution for about 2 hours. It should be appreciated that contacting the 3D printed non-conductive article, which included the copper metal particles, with the metal plating bath resulted in the deposition of copper metal on the 3D printed non-conductive article and/or the copper metal particles thereof to produce the 3D printed conductive article. After treatment with the metal plating bath, the 3D printed conductive article was washed with deionized water and dried.

Example 3

The conductivity of the 3D printed conductive article prepared in Example 2 was evaluated. Particularly, the conductivity of the 3D printed conductive article prepared in Example 2 was evaluated in a 4 point resistance test according to the standard ASTM F390 method ("Standard Test Method for Sheet Resistance of Thin Metallic Films with a Collinear Four-Probe Array"). It was surprisingly and unexpectedly discovered that the 3D printed conductive article produced with the 3D printable composition of Example 1 exhibited resistance comparable to bulk copper. Particularly, a resistance of about 2.0E-8 ohm meter ($\Omega \cdot m$) was measured for the 3D printed conductive article, while bulk copper generally exhibits a resistance of about 1.7E-8 $\Omega \cdot m$. It should be appreciated that the conductivity of multiple 3D printed conductive articles were evaluated. It was further surprisingly and unexpectedly discovered that the conductivity or resistivity may be at least partially determined by the surface morphology of the 3D printed conductive articles. For example, a resistance of about 1.8E-8 $\Omega \cdot m$ was measured in a 3D printed conductive article having a relatively smoother surface than another 3D printed conductive article, which exhibited a resistance of about 3.5E08 $\Omega \cdot m$. As such, it should be appreciated that the resistivity or conductivity of the 3D printed conductive article may be tuned, modulated, or modified (e.g., increased or decreased) by controlling the surface morphology thereof.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A kit for additive manufacturing of a conductive article, the kit comprising:
    an additive manufacturing composition comprising a 3D printable material and a metal precursor disposed in the 3D printable material, wherein the metal precursor comprises a metal salt, a metal particle, or combinations thereof;
    a water soluble 3D printable filament, powder, or resin;
    an activation solution comprising a reducing agent and configured to activate the metal precursor of the additive manufacturing composition; and
    a deposition solution configured to deposit metal on or about the activated metal precursor.

2. The kit of claim 1, wherein the 3D printable material comprises at least one water insoluble polymer.

3. The kit of claim 1, wherein the 3D printable material comprises one or more of acrylonitrile butadiene styrene (ABS), polylactic acid (PLA), thermoplastic polyurethane (TPU), polystyrene, polypropylene (PP), polyethylene (PE), ethylene vinyl acetate (EVA), thermoplastic polyolefin (TPO), rubber, polycaprolactone (PCL), polyethylene terephthalate (PET), polyethylene terephthalate glycol (PTG), polyamide, polyether, polyester, polymethylmethacrylate (PMMA), polyurethane copolymers, ethylene vinyl alcohol, or combinations thereof.

4. The kit of claim 3, wherein the 3D printable material is selected from the group consisting of PLA, PCL, ABS, and combinations thereof.

5. The kit of claim 1, wherein the metal precursor comprises the metal salt, and wherein the metal salt comprises a metal cation selected from the group consisting of a nickel cation, a zinc cation, a tin cation, a platinum cation, copper cation, a palladium cation, a silver cation, a gold cation, an aluminum cation, an iron cation, a magnesium cation, and combinations thereof.

6. The kit of claim 1, wherein the metal salt comprises an anion selected from the group consisting of an acetylacetonate, 2-ethylhexanoate, phthalocyanine, fluoride, chloride, bromide, iodide, sulfide, nitrate, phosphate, carbonate, oxalate, formate, sulfate, triflate, bis(trifluoromethyl)sulfonimide, tetrafluoroborate, hexafluorophosphate, and combinations thereof.

7. The kit of claim 1, wherein the metal salt comprises one or more of copper (II) acetylacetonate ($Cu(O_2C_5H_7)_2$), copper sulfate ($CuSO_4 \cdot 5H_2O$) copper chloride, copper citrate, copper acetate, copper phosphate ($Cu_3(PO_4)_2$), gold chloride (AuCl), gold bromide (AuBr), gold iodide (AuI), tetrabromoauric acid ($HAuBr_4$), tetrachloroauric acid ($HAuCl_4$), palladium sulfate ($PdSO_4 \cdot 7H_2O$), palladium chloride, palladium nitrate, palladium acetate, palladium 2,4-pentanedionate, or combinations thereof.

8. The kit of claim 1, wherein the composition consists of the 3D printable material and the metal precursor.

9. The kit of claim 8, wherein the 3D printable material consists of polylactic acid and the metal precursor consists of copper (II) acetylacetonate ($Cu(O_2C_5H_7)_2$).

10. The kit of claim 1, wherein the additive manufacturing composition is a 3D printable filament.

11. The kit of claim 1, wherein the additive manufacturing composition is a 3D printable powder.

12. The kit of claim 1, wherein the additive manufacturing composition is a 3D printable resin.

13. The kit of claim 1, wherein the metal precursor comprises the metal particle, and wherein the metal particle comprises one or more of copper particles, silver particles, gold particles, aluminum particles, magnesium particles, manganese particles, iron particles, nickel particles, zinc particles, tin particles, platinum particles, palladium particles, or combinations thereof.

14. A method for fabricating a conductive article with the kit of claim 1, the method comprising:
    forming a first layer of an article on a substrate, the first layer comprising the additive manufacturing composition;
    forming a second layer of the article adjacent the first layer, wherein the second layer comprises the water soluble 3D printable filament, powder, or resin, wherein the water soluble 3D printable filament, powder, or resin comprises a water soluble polymer;
    binding the first layer with the second layer to fabricate the article; and
    plating a metal on at least a portion of the article to fabricate the conductive article.

15. The method of claim 14, further comprising activating the metal precursors with the reducing agent.

16. The method of claim 15, wherein plating the metal on at least a portion of the article comprises an electroless plating process.

17. The method of claim 16, wherein the electroless plating process further comprises depositing metal on or about the activated metal precursors.

18. The method of claim 14, wherein the second layer further comprises a 3D printable material substantially free of any metal precursors.

19. The method of claim 14, further comprising:
    generating a digital model of the article with a computer aided design assembly; and
    partitioning the digital model into at least a first digital cross-section and a second digital cross-section,
    wherein forming the first layer of the article on the substrate comprises forming the first layer of the article on the substrate using the first digital cross-section as a first template; and
    wherein forming the second layer of the article adjacent the first layer comprises forming the second layer of the article adjacent the first layer using the second digital cross-section as a second template.

20. The method of claim 14, wherein the conductive article comprises a conductivity of at least 1E6 Siemens per meter (S/m).

* * * * *